United States Patent [19]
Song et al.

[11] Patent Number: 5,619,259
[45] Date of Patent: Apr. 8, 1997

[54] DISTRIBUTOR OF HIGH-DEFINITION TELEVISION

[75] Inventors: Jin-Wook Song; Geum-Ock Lee, both of Seoul, Rep. of Korea

[73] Assignee: Hyundai Electronics Industries Co., Ltd., Rep. of Korea

[21] Appl. No.: 364,703

[22] Filed: Dec. 28, 1994

[30] Foreign Application Priority Data

Dec. 29, 1993 [KR] Rep. of Korea ............... 93-30560

[51] Int. Cl.$^6$ ............................................. H04N 17/00
[52] U.S. Cl. ............................................. 348/181; 348/719
[58] Field of Search ............................. 348/175, 177, 348/181, 192, 466, 180, 719, 384; 358/426, 261.1

[56] References Cited

U.S. PATENT DOCUMENTS 5,099,319  3/1992  Esch et al. ................................. 348/9
5,191,418  3/1993  Tran .

Primary Examiner—Victor R. Kostak
Attorney, Agent, or Firm—David M. Klein; Bryan Cave LLP

[57] ABSTRACT

A distributor of high-definition television is disclosed that processes inputted serial data as parallel, 24 bit data. During the processing, header data from a central buffer is removed, and a point of time for reading out data from the central buffer is controlled as a starting bit, resulting in prevention of errors and stable data processing.. The present invention includes a device for storing an experimental pattern, for storing a pattern to test the distributor; a device for generating a pattern, for outputting a pattern from the experimental pattern stored in the storage device the experimental pattern, and optional data inputted from an external source; central processing unit, for processing in parallel serial data selected from the device for generating and removing the header data and processing 24 bits each the data to output; central buffer for storing data which is inputted from the central processing unit by 24 bits and for controlling the processing speed of the data; and variable length decoder for decoding a length of the data transmitted from the central processing means.

5 Claims, 3 Drawing Sheets

FIG. 4A
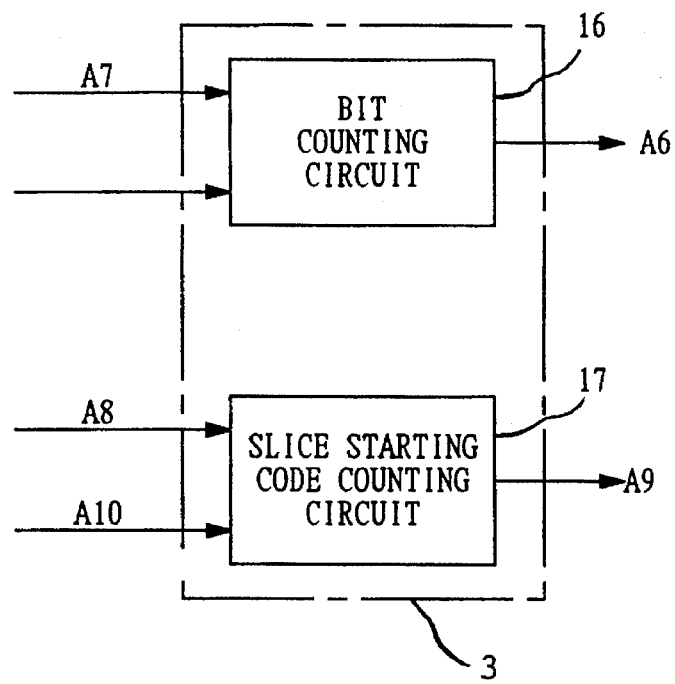
FIG. 4B
FIG. 5
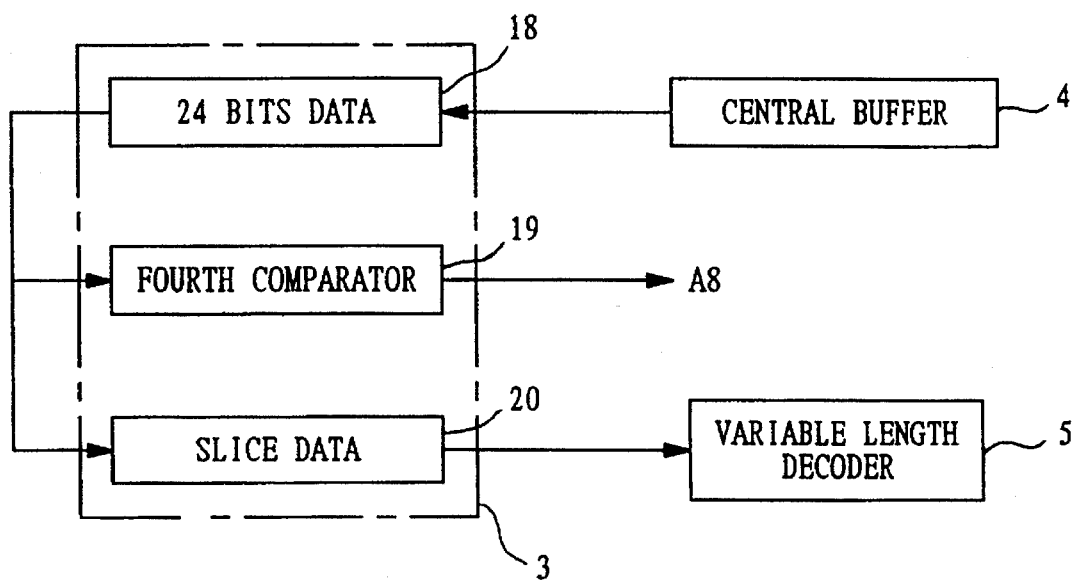

5,619,259

DISTRIBUTOR OF HIGH-DEFINITION TELEVISION

BACKGROUND OF THE INVENTION

1. Field of the Invention

The present invention relates generally to a distribution device for high-definition television, and more particularly to a distributor of high-definition television where a header data of a central buffer is removable to prevent an occurrence of errors during an input serial data is processed in parallel 24 bits each and it is ease to debug after finishing assembling a system as well as a stable data procession can be performed due to a control of a only starting one bit of a write address.

2. Description of the Conventional Art

A distributor of digital high-definition television HDTV is a device that distributes data serially input into it as desired pieces of parallel data.

Conventionally, the serial data inputted to the distributor is processed, in parallel, 24 bit groups and then recorded in a central buffer. At that time, the header data of the central buffer makes an occurrence of errors during the data processing because the data of 24 bits is written on the central buffer without clearing the head data before recording. Also, this prior art distributor has disadvantages of unstable data processing because the central buffer controls an address in several bits when it reads out the data.

SUMMARY OF THE INVENTION

An object of the invention is to overcome the problem and disadvantages of the distributor described above. Thus, the present invention provides a distributor of HDTV where the header data of the central buffer is cleared so that errors are prevented from occurring during an inputted serial data is in parallel processed 24 bits each and a starting only one bit written on the address is controlled when the central buffer begins to read out the data so that it is stable to process the data.

To achieve this and other objects of the invention, as embodied and broadly described herein, the distributor comprises a means for storing an experimental pattern, which stores the pattern so that it is possible to test within the distributor itself; means for generating a pattern, which outputs one selected from the experimental pattern stored in the means for storing the experimental pattern and an optional data inputted from an external; central processing means, which outputs, in parallel and 24 bits each, the serial data selected from the means for generating the pattern after clearing the header data; a central buffer, which stores the data inputted from the central processing means and controls the speed of processing; and a variable length decoder, which decodes the length of the data transmitted from the central processing means.

It is to be understood that both the foregoing general description and the following detailed description are exemplary and explanatory and are intended to provide further explanation of the invention as claimed.

The accompanying drawings, which are incorporated into and constitute a part of this specification, illustrate one embodiment of the invention and together with the description, serve to explain the principles of the invention.

BRIEF DESCRIPTION OF THE DRAWINGS

FIG. 4A is a block diagram of a bit factor of the central processing unit of FIG. 1.

FIG. 4B is a block diagram of a starting slice code factor of the central processing unit of FIG. 1.

FIG. 5 is a block diagram where the central processing unit reads data and outputs it to the variable length decoder of FIG. 1.

DETAILED DESCRIPTION OF THE PREFERRED EMBODIMENT

Reference will now be made in detail to the preferred embodiment of the invention, an example of which is illustrated in the accompanying drawings.

Figure 1:
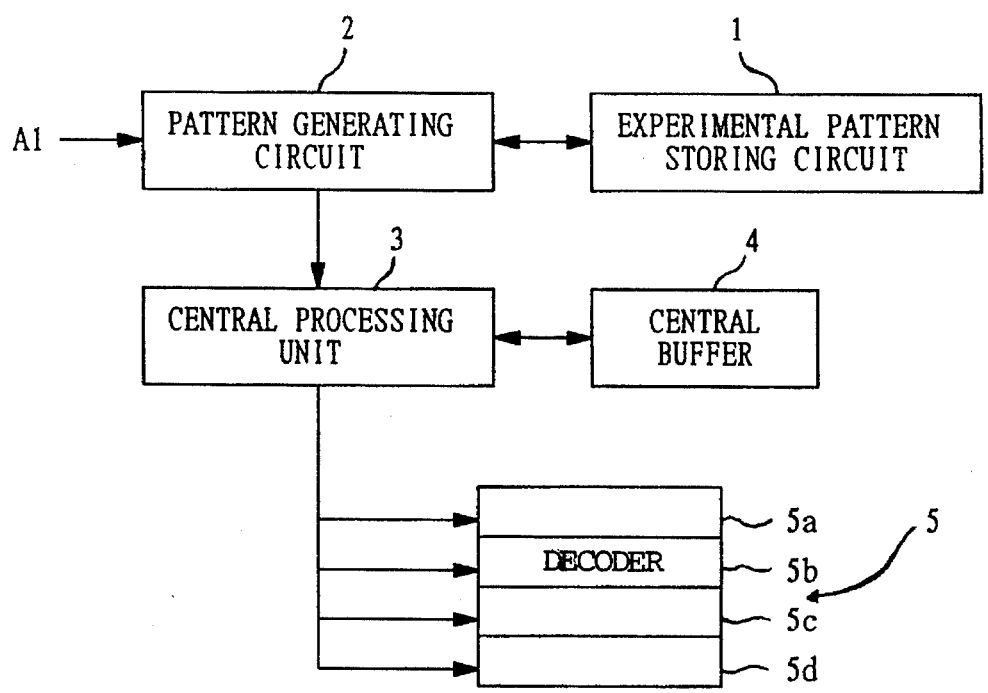
FIG. 1 is a block diagram of a distributor of a high-definition television according to a preferred embodiment of the present invention.

FIG. 1 shows the preferred distributor, including means for storing an experimental pattern 1 which stores a pattern so that it is possible to test the distributor itself; means for generating the pattern 2 which outputs an experimental pattern stored in the means for storing the experimental pattern 1, and receives bit data A1 of 17 MHz inputted from an external source; a central processing means 3 which outputs, in parallel and 24 bits each, the serial data selected from the means for generating the pattern 2, after clearing the header data; a central buffer 4 which stores the data inputted from the central processing means 3 and controls the speed of processing and a variable length decoder 5 comprising first to a fifth decoders 5a to 5d. The decoder which decodes the variable length data which is, 24 bits each, processed and inputted from the central processing means 3.

Figure 2:
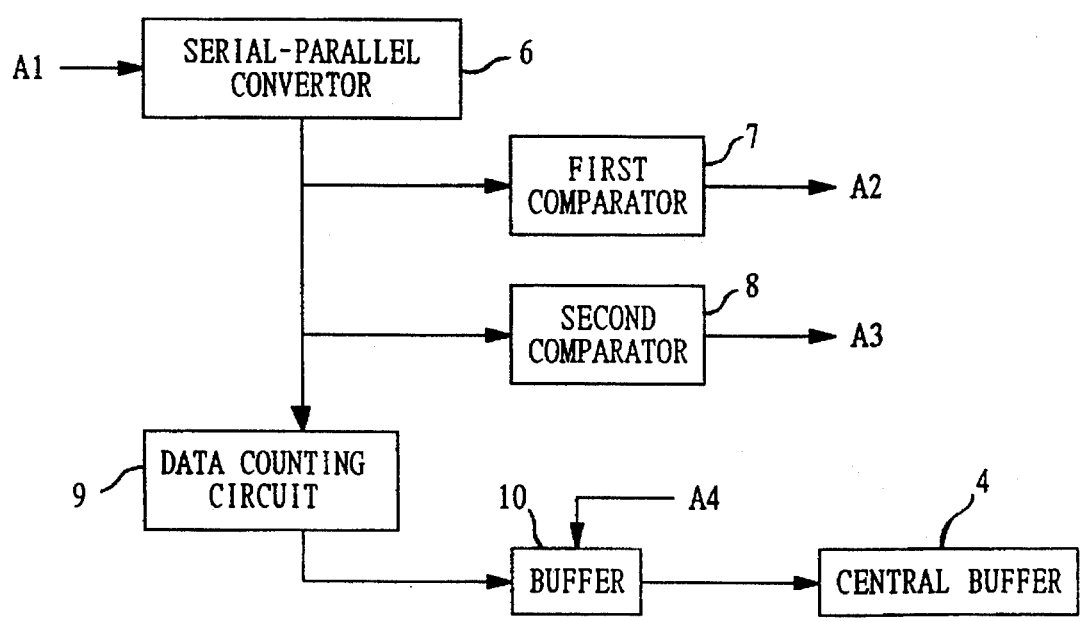
FIG. 2 is a block diagram of a central processing unit of FIG. 1 that transmits data to the central buffer of FIG. 1.

FIG. 2 shows the central processing means 3 comprising a serial-parallel convertor 6 that converts a serially inputted bit data A1 of 17 MHz to parallel output data of 32 bits; a first comparator 7 that detects a frame starting code A2 of 32 bits according to a result obtained from comparing the parallel data of 32 bits outputted from the serial-parallel convertor 6; a second comparator 8 that searches a succeeding 24 zero data from the lower rank among the 32 bit parallel data outputted from the serial-parallel convertor 6, and recognizes and removes them as a stubbing data A3; a data counting circuit 9 that counts and outputs 24 bits each the data from a starting code of 32 bit slice data outputted from the serial-parallel convertor 6;and a buffer 10 that writes the 24 bit data enabled by an external enabling signal A4 to the central buffer 4.

The operational efficiency of the preferred embodiment of the present invention described above will now be detailed with reference to the accompanying drawings.

First, as shown in FIG. 1, the pattern generating circuit 2 inputs to the central processing unit 3 one selected from the experimental pattern generated from the experimental pattern generating circuit 2 and data A1 serially inputted from an external source.

The central processing unit 3 processes in parallel the data serially inputted from the pattern generating circuit 2. After this, CPU 3 removes the header data included in the data, processes the data 24 bit groups to write on the central buffer 4, and then reads the data out again to input to the variable length decoder 5. The variable length decoder 5 comprises first to fourth decoders 5a to 5d. This decoder 5 decodes the 24 bit data inputted from the central processing unit 3 into original length data.

FIG. 2 is a detailed description of FIG. 1 and shows the central processing unit which transmits the data to the central buffer. In the serial-parallel convertor 6, the bit data A1 of 17 MHz serially inputted from the external source is converted into parallel 32 bit data to input to the first and second comparators 7 and A4 and the data counter 9.

The first comparator 7 detects and outputs the frame starting code A2 from the 32 bit parallel data inputted from the serial-parallel convertor 6.

The second comparator 8 searches the succeeding 24 zero data from the lower rank among the 32 bit parallel data outputted from the serial-parallel convertor 6, and recognizes and removes them as stubbing data A3.

After the data counting circuit 9 removes the header data A2 and A3, counting circuit 9 counts 24 bits each the data from the starting code of the slice data and writes the 24 bit data on the central buffer 4 through the buffer 10 operated by the external enabling signal A4.

Figure 3:
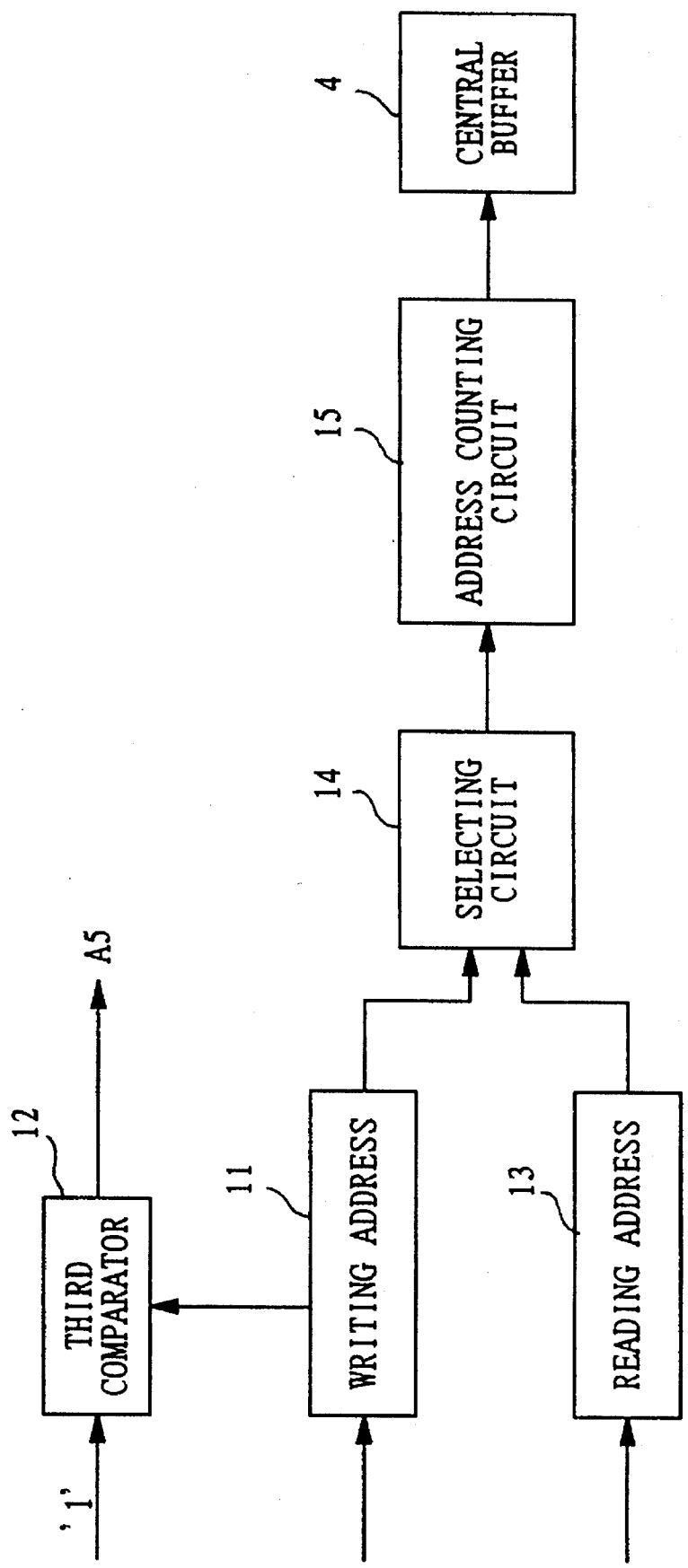
FIG. 3 is a block diagram of the central processing unit of FIG. 1 that has control over reading and writing data to the central buffer of FIG. 1.

FIG. 3 shows in detail the central processing unit 3 which has control of reading and writing the data on the central buffer of FIG. 1. The 24 bit data generated from the data counting circuit 9 is succeedingly written on the central buffer 4 so that a writing address 11 of the central buffer 4 comes to be full. And then, if the starting bit of the writing address 11 is a "1", a flag as buffer delay code match is generated by the central buffer 4.

The writing address 13 recognizes the flag as BUFFER DELAY CODE MATCH A5 and transmits a signal through the selector 14 and the address counting circuit 15 to the central buffer 4 and then the central processing unit begins to read out.

The central buffer 4 receives a clock of 449 Hz inputted from the external source and then this clock is generated to output four slices to the variable length decoder 5.

FIG. 4A also shows in detail the central processing unit 3. A corresponds to a bit counting circuit 16 of the central processing unit 3. The bit counting circuit 16 counts 24 bits each the data of the data counting circuit 9 to write on the central buffer 4. At that time, after the bit counting circuit 16 counts the 24th bit and generates a signal A6, it is made to pause to write by a bit count clear signal A7 and then receives new 24 bit data.

FIG. 5 shows that the central processing unit 3 reads out the data on the central buffer to output to the variable length decoder 5. The 24 bit data 18 which is read out on the central buffer 4 is compared in a fourth comparator 19 to search for a starting slice code A8 to transmit to the starting slice counting circuit 17 of FIG. 4B.

The slice counting circuit 17 counts 4 each the inputted slices to output four slice data 20 to the variable length decoder 5.

According to an increase of the slice counter beginning with a first slice code, if a fifth slice code is outputted, a starting slice code counting circuit 17 recognizes the fifth slice code to output a signal A9. An operation of the slice counting circuit 17 pauses responsive to a clear signal A10 and waits for the clock signal of 449 Hz inputted from the external source.

Next, following the 24 bit data which has already been outputted, data is read out on the central buffer 4 to output to the variable decoder 5.

As described above, according to the present invention, the header data of the central buffer is removable to prevent an occurrence of errors during the inputted serial data is processed in parallel 24 bits each and it is easy to debug after assembly of a system. Further, a point of time for starting to read out the data on the central buffer is controlled as a only starting one bit to achieve stable data processing rather than data processing by recognition of several bits.

Other embodiments of the present invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A video signal distributor for a high definition television, comprising:

experimental pattern storing means for storing an experimental pattern for self-testing the distributor;

pattern generating means for selecting an experimental pattern stored in said experimental pattern storing means and for selecting a serial data compressed digital video signal comprising header data, said digital video signal being separated by a video/audio separator;

a central processing unit for converting the serial data selected by said pattern generating means into 24 bit parallel data after removing the header data;

central buffer means for storing the 24 bit parallel data in accordance with a control of said central processing unit and for controlling a processing speed of data; and variable length decoding means for decoding the 24 bit parallel data outputted from the central processing unit.

2. The distributor of claim 1, wherein said central processing unit comprises:

a serial/parallel converting circuit for converting the serial data outputted from the pattern generating means into the 24 bit parallel data;

a first comparator for detecting a frame starting code from 32 bit parallel data outputted from said serial/parallel converting circuit;

a second comparator for detecting 24 zero data from the 32 bit parallel data outputted from the serial/parallel converting circuit and for recognizing it as a stubbing data and for removing said 24 zero data;

a data counting circuit for counting the data from a slice starting code of 32 bit data outputted from the serial/parallel converting circuit by 24 bits; and a buffer enabled in accordance with an enable signal for writing the 24 bit data counted by the data counting circuit to a central buffer.

3. The distributor of claim 1, wherein said central processing unit comprises means for removing header data from the output signal of the pattern generating means and for storing to the central buffer means.

4. The distributor of claim 1, wherein the time of reading the 24 bit data from the central buffer means is directed to controlling a most significant bit by 1 of the central buffer means.

5. The distributor of claim 1, wherein said central processing unit comprises means for detecting a slice starting code by comparing the 24 bit data at a fourth comparator so as to read four slice data to the central buffer means and to counting the slice data in the slice starting code counting circuit and to stopping, the reading when fifth slice starting code is read.

* * * * *